United States Patent [19]

Behlmer et al.

[11] Patent Number: 5,022,951

[45] Date of Patent: Jun. 11, 1991

[54] LABEL REMOVAL AND APPLICATOR HAND TOOL

[75] Inventors: Robert F. Behlmer, Wauwatosa; Robert L. Schanke, New Berlin; Robert G. DeSmidt, Cedar Grove, all of Wis.

[73] Assignee: W. H. Brady Co., Milwaukee, Wis.

[21] Appl. No.: 411,067

[22] Filed: Sep. 19, 1989

[51] Int. Cl.[5] .......... B32B 31/00

[52] U.S. Cl. .......... 156/379; 156/538; 156/579; 156/584

[58] Field of Search .......... 156/579, 584, 344, 249, 156/379, 538; 30/169; 81/9.21, 487

[56] References Cited

U.S. PATENT DOCUMENTS

| | | | |
|---|---|---|---|
| 2,460,007 | 1/1949 | Hasselquist | 81/487 |
| 4,248,660 | 2/1981 | Johnson | 156/579 |
| 4,704,795 | 11/1987 | Primach | 30/169 |
| 4,709,478 | 12/1987 | Cortelyou, Jr. | 30/169 |
| 4,750,962 | 6/1988 | Haygood et al. | |

FOREIGN PATENT DOCUMENTS 24510 of 1913 United Kingdom .......... 156/579

OTHER PUBLICATIONS

Marko-Tryck AB Marking System Product Brochure.

*Primary Examiner*—David A. Simmons
*Assistant Examiner*—Chester T. Barry
*Attorney, Agent, or Firm*—Quarles & Brady

[57] ABSTRACT

A removal and applicator hand tool for adhesive labels having a movable label retainer-wiper plate affixed between spaced lower and upper elements of a foot member in which the plate moves between a first position to grip a label between it and the lower element for retaining a label removed from an assembly with the tool and transporting it to an object and a second position separated from the lower element for removal of a label from an assembly and for release of the label upon application to the object.

4 Claims, 2 Drawing Sheets

LABEL REMOVAL AND APPLICATOR HAND TOOL

FIELD

The present invention relates to a hand tool to be used for removing a pressure sensitive adhesive label carried on a liner, transporting the label to an object to which it is to be applied, and then assisting in application of the label to the object.

BACKGROUND

Pressure sensitive adhesive labels are typically delivered to an end user in the form of an assembly that includes a plurality of labels releasably adhered to a liner, the assembly often including several rows and columns of labels. The labels can be supplied with preprinted identification legends, or supplied unprinted so that the end user can print its selected legends onto the labels before they are applied to an object. The identification legends typically include alphanumeric information, such as serial numbers, production data, or any other selected information. The assembly can be in the form of a sheet, a fan folded assembly, a roll of labels, or a web or strip of liner carrying the labels.

When it is time to apply a label bearing a printed identification legend to an object, various problems can arise with the usual procedure in which a person removes a label from the assembly with his or her fingers, which problems are described in greater detail hereinafter. We have, therefore, sought to eliminate these problems by developing a hand tool that does not require a person to actually touch the labels with their fingers.

One of the principle objectives of our present invention is to develop a hand tool that can be used to readily and effectively remove a pressure sensitive adhesive label from an assembly without physically deforming the label.

Another main objective of our invention is to develop a removal tool for pressure sensitive labels that is further characterized as providing for gripping the label after it is removed from an assembly and retaining it while being transported to the object to which it is to be applied.

Another main objective of our present invention is to develop a removal and transport tool for pressure sensitive adhesive labels that can assist in applying the label to an object in such fashion that it will be smoothly and firmly adhered to the object.

An additional principle objective of our invention is to provide a label removal, transport and applicator tool that enables a person applying a label with the tool to see the label as it is being applied so as to thereby assure that the legend of the label is properly oriented with the object to which the label is applied.

SUMMARY OF THE INVENTION

Our present invention relates to a label removal and applicator tool capable of meeting the foregoing and other objectives comprising a handle and a foot member extending from the handle that has a lower element spaced from an upper element. The lower element of the foot member has a horizontal exterior bottom wall and an inclined inner wall. Further, a label retainer-wiper plate is affixed to the foot member and has an aft retainer panel that is parallel to the inner wall of the lower element of the foot member and also includes a horizontal forward wiper panel extending from the retainer panel. The retainer panel of the label retainer-wiper plate can be flexed towards and away from the inner wall of the lower element of the foot member. A pressure sensitive adhesive label is removed from the assembly between the inclined inner wall of the lower element of the foot member and the aft retainer panel of the label retainer-wiper plate; further, the label is gripped between these two components after being removed from an assembly so that it is firmly held in place while being transported to an object; still further, the label is in effect wiped onto the surface of an object with the forward wiper panel of the retainer-wiper plate during application. The retainer-wiper plate of the tool is transparent in the most preferred embodiment, thereby enabling the person using the tool to see the label as it is being applied.

Several presently preferred embodiments of our new label removal and applicator tool are described in full and enabling detail in the ensuing description by reference to the accompanying drawings, in which.

(a) BACKGROUND DISCUSSION

Figure 7:
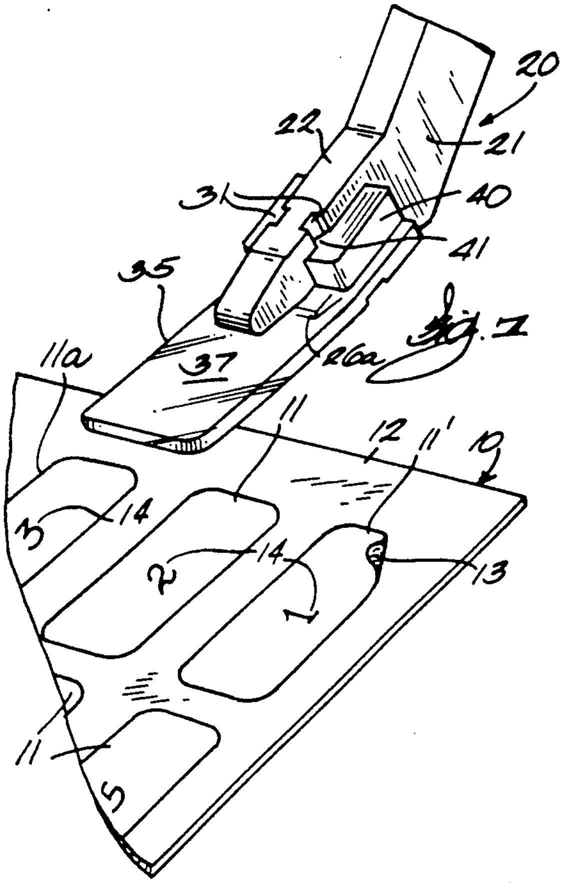
FIG. 7 is a perspective view, with portions broken away, illustrating the tool of FIGS. 1-5 in an initial step involved in using the tool to remove a pressure sensitive adhesive label from the liner of an assembly of labels.
Figure 9:
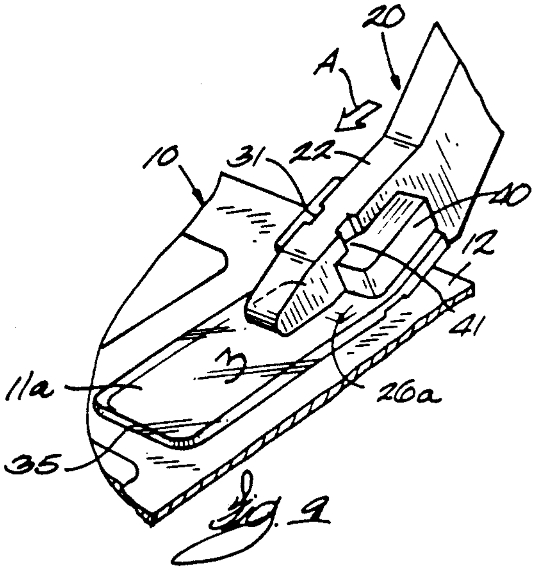
FIG. 9 is a perspective view similar to FIG. 7 illustrating the tool in an intermediate position during removal of a label from the assembly.

FIG. 7 illustrates the type of products for which the label removal and applicator tool of the invention was developed. An assembly 10 comprises a plurality of pressure sensitive labels 11 that are releasably adhered to a liner 12. As shown by the turned-up corner of label 11' in FIG. 7, each label 11 has a layer 13 of pressure sensitive adhesive on its bottom surface, which layer will be used to affix the label to an object. The liner 12 acts as a temporary storage element for the labels until they are ready to be applied. The labels can be of any appropriate material, such as plastic film or paper, coated on one surface with pressure sensitive adhesive. The liner 12 is to have a low adhesion to the pressure sensitive adhesive layer of the labels so that the labels can be removed from the liner when they are to be applied to an object without delamination of the pressure sensitive adhesive. The liner can be of fibrous material, such as paper, or non-fibrous material, such as synthetic plastic, and can be coated or impregnated as necessary with a suitable release agent in order that the labels can be removed from the liner without delamination of the pressure sensitive adhesive layer.

An assembly 10 of pressure sensitive adhesive labels is often supplied to the end user without printing on the labels, which allows the end user to apply suitable legends such as identification information, serial numbers, etc., to the labels for its specific purpose. Also, however, an assembly can be supplied to the end user with preprinted legends on the labels. The labels 11 are shown in FIGS. 7-12 as having identification legends 14, either preprinted or applied by the end user. The assembly can have pinfeed holes along opposite longitudinal edges so that it can be fed through an appropriate printing mechanism, such as a computer controlled printer. The assembly can be supplied to the end user in any appropriate configuration, such as individual sheets, in roll form, or as a fan folded assembly.

Problems arise when the end user wants to remove individual labels from the assembly in order to apply them to the selected object. This is typically done now by a person peeling a label off the assembly manually. Problems arise, however, because it is often very easy to crease or fold the label when peeling it off the liner with one's fingers, or finger nails, which often results in the label being unusable. This problem can be especially acute when the label is made of thin or very flexible material, such as thin plastic film. Another problem resulting from this type of label removal is that the person's fingers can often contaminate the pressure sensitive adhesive so that the label cannot be firmly affixed to the object. Still further problems arise when a person tries to apply the label to an object while holding onto the label with their fingers, which many times results in the label being applied with a crease or fold and makes it difficult to accurately position the label on an object. In addition, it can be difficult to properly orient the legend on the label with the object. Many of these problems are magnified when the labels are quite small in size.

The foregoing and other problems provided the impetus for the development of our present invention, comprising a small hand held label removal and applicator tool that eliminates the problems presented by removing a label from a liner with one's fingers, and our new tool is described in the ensuing portions of this specification.

(b) Detailed Description of Label Removal and Application Tool, FIGS. 1-6

FIGS. 1-5 illustrate the presently-preferred structure of a label removal and applicator tool constructed in accordance with our present invention.

Figure 5:
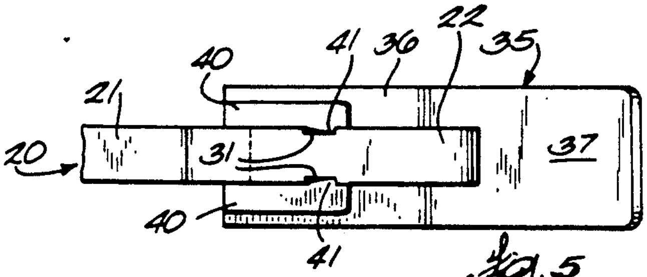
FIG. 5 is an enlarged view of a portion of the tool of FIG. 1 as viewed from plane 5—5 of FIGS. 1.

A tool 20 of the invention is illustrated in FIGS. -5 that includes a handle 21 and a foot member 22 extending from the lower end of the handle at an angle to the handle. Foot member 22 includes a lower element 23 and an upper element 24 wherein the lower element is spaced from, or separated from, the upper element.

Figure 4:
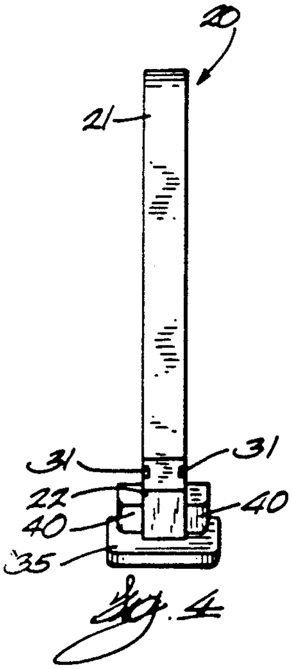
FIG. 4 is a front view of the tool of FIG. 1.
Figure 2:
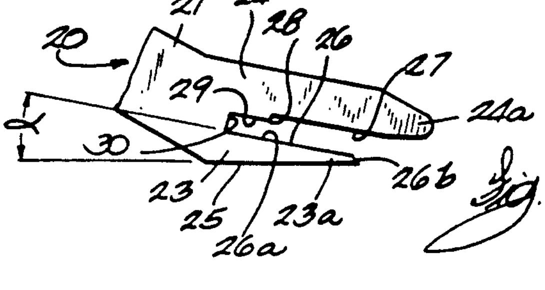
FIG. 2 is an enlarged side view of the foot member of the tool of FIG. 1.

As best seen in FIG. 2, lower element 23 of the foot member has a horizontal bottom, or exterior, wall 25 and an inclined inner wall 26 that is at an angle α to bottom wall 25. The lower element 23 thus has a leading edge portion 23a defined by the intersection of its walls 25 and 26. Upper element 24 has a first inner wall 27 that is parallel to inclined inner wall 26 of the lower element and spaced therefrom, a transverse step 28 at the inner end of first inner wall 27 and a second inner wall 29 that also is parallel to wall 26 of the lower element. Inner wall 26 of the lower element and second inner wall 29 of the upper element both terminate along an interior end wall 30. End wall 30 also is the termination of the separation between lower element 23 and upper element 24 of the foot member 22. A locking groove 31 is formed on each side of the upper element 24 of the foot member that is perpendicular to the first inner wall 27 of the upper element. This provides a locking groove 31 on each side of the foot member, which are best seen in FIGS. 4 and 5.

A label retainer-wiper plate 35 is affixed to the foot member 22 of the tool between the lower element 23 and upper element 24 thereof. The retainer-wiper plate 35 has an aft retainer panel 36 and a forward wiper panel 37 extending from the retainer panel. Panel 37 is horizontal and panel 36 is inclined at angle α from panel 37. A transverse groove 38 extends across the bottom of retainer panel 36 close to but slightly behind its junction with wiper panel 37 for a purpose described in part (c) of this specification. Panel 36 of plate 35 fits snugly between inclined inner wall 26 of lower element 23 and second inner wall 29 of the upper element 24 and has an inner end wall 39 (FIG. 3) that bears against end wall 30. Panel 36 of plate 35 is thereby spaced from first inner wall 27 of upper element 24 a distance equal to the height of step 28. With this relationship, the bottom 36a of retainer panel 36 of the plate bears against inner wall 26 of the lower element. The wiper panel 37 of plate 35 extends forwardly of lower element 23 and extends horizontally from bottom wall 25 of the lower element.

The retainer-wiper plate 35 is to be held in fixed position on the foot member 22 of the tool. In the embodiment as shown in FIGS. 1-5, plate 35 includes a pair of spaced vertical ribs 40 that are spaced apart a distance equal to the thickness of the foot member 22. A triangular detent 41 is defined along the inner surface of each rib 40. In the assembled condition, see especially FIG. 5, the detent 41 of a rib 40 engages the locking groove 31 on its respective side of the foot member 22, so as to thereby firmly secure the plate 35 to the foot member between its lower and upper elements. This construction is particularly useful when the tool is made of molded plastic material, as the ribs and detents can be formed as integral elements of a molded plate 35. Also, see especially FIG. 3, ribs 40 extend beyond end wall 39 of plate 35 so as to restrain turning, i.e. rotation in the horizontal plane, of plate 35.

Figure 1:
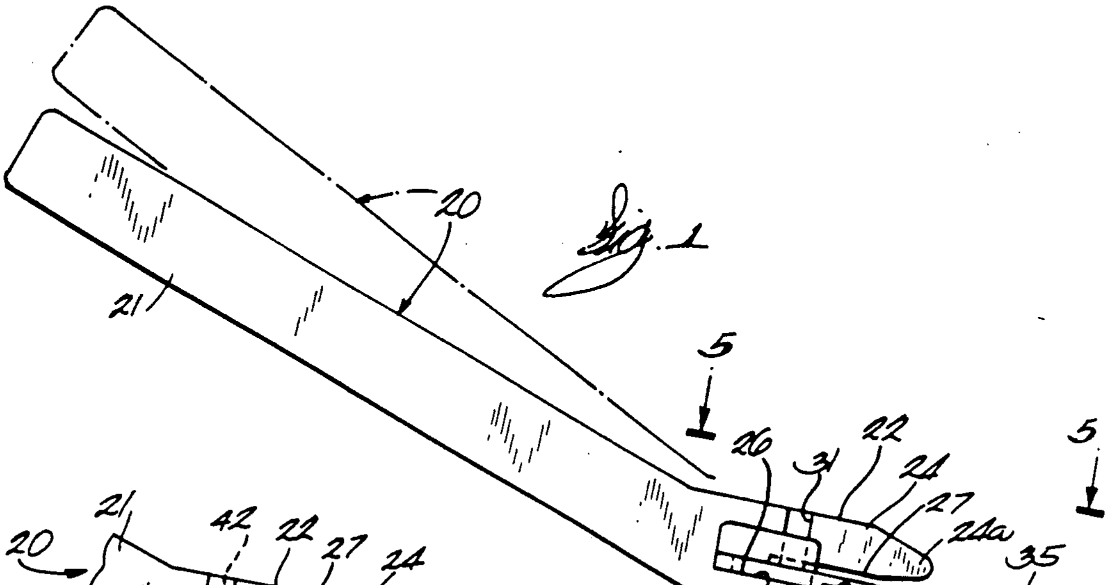
FIG. 1 is a side view of a label removal and applicator tool of the invention.
Figure 6:
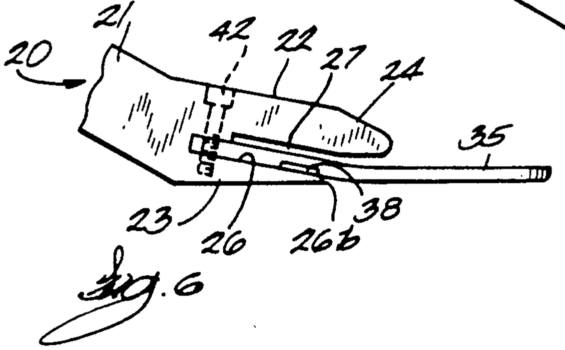
FIG. 6 is an enlarged side view similar to FIG. 2 illustrating an alternate construction of a tool of the invention.
Figure 3:
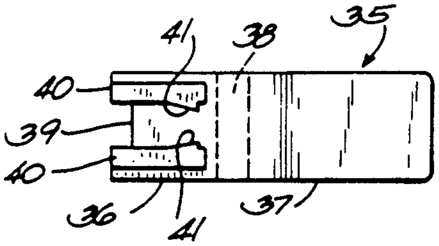
FIG. 3 is a top view of the label retainer-wiper plate of the tool of FIG. 1.

Alternatively, plate 35 can be secured to the foot member with mechanical fastening means. Referring to FIG. 6, for example, an alternate embodiment is shown in which plate 35 is secured in position between lower element 23 and upper element 24 of foot member 22 by means of a screw 42 that is threaded through the upper element of the foot member, through the plate 35, and into the lower element of the foot member. This construction eliminates the locking grooves 31 and ribs 40 of the embodiment as shown in FIGS. 1-5.

The aft retainer panel 36 of label retainer-wiper plate 35 has a first position in which it bears against the inner wall 26 of the lower element of the foot member. However, for a purpose to be hereinafter described, plate 35 is to be sufficiently movable or flexible that at least a forward portion of its panel 36 can move to a second position away from wall 26 towards wall 27.

(c) Operation of Label Removal and Applicator Tool, FIGS. 7-12

The manner in which label applicator and removal tool 20 is employed to remove a label from an assembly and apply it to an object is illustrated in the sequential views of FIGS. 7-12.

Figure 10:
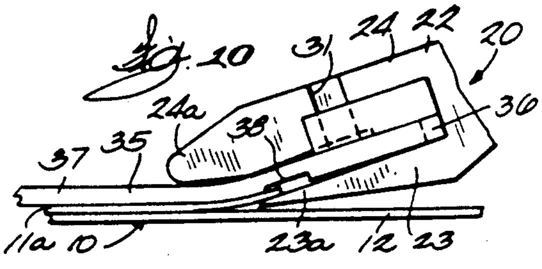
FIG. 10 is an enlarged side view of the step of FIG. 9.

Tool 20 is brought alongside the assembly 10 with plate 35 in its first position in which retainer panel 36 thereof bears against inner wall 26 of the lower element of the foot member. Next, as shown in FIG. 7, the wiper panel 37 of the plate 35 is pressed against liner 12 in a horizontal position alongside the label to be removed from the assembly, which is identified as label 11*a* in FIGS. 7-12, and handle 21 of the tool is rocked forward (as shown by the dashed line position of the handle in FIG. 1) until nose portion 24*a* of upper element 24 contacts wiper panel 37. The plate 35 is thereby deflected upwards a slight amount, see now FIG. 8, such that the forward portion of retainer panel 36 of the plate moves away from inner wall 26 of the lower element 23 of foot member 22 towards first inner wall 27 of second element 24 of the foot member. With plate 35 in this upper position relative to the lower element 23, still referring to FIG. 8, the tool 20 is moved in the direction of arrow A towards an end of label 11*a* so that the leading edge portion 23*a* of lower element 23 rides underneath the adhesive layer of label 11*a*. This movement of the tool 20 results in an end portion of label 11*a* being lifted from liner 12 and moved a short distance between inner wall 26 of lower element 23 and the facing bottom surface of retainer panel 36 of plate 35. As shown in the drawings, inner wall 26 of lower element 23 includes a long first panel 26*a* that is inclined at angle $\alpha$ to horizontal bottom wall 25 of the lower element and a short second panel 26*b* at its leading edge that is at an angle greater than $\alpha$ to bottom wall 25. During development of a tool of the invention that will be commercialized after filing this application for patent, it was found that an angle $\alpha$ between first panel 26*a* of the inner wall and bottom wall 25 of the lower element on the order of about 12° provided a tool with an especially good label lifting capability. Also, it was found that an angle of about 30° between second panel 26*b* of the inner wall and bottom wall 25 of the lower element was effective to further assist in removal of a label from the liner, and panel 26*b* only 1/32" long was suitable. This condition is shown in perspective in FIG. 9 and in side view in FIG. 10. Generally, about ⅛ inch of the label will be inserted between panel 36 and wall 26 during this action. Groove 38 extends transversely across the bottom 36*a* of retainer panel 36 of plate 35 and serves to limit the extent to which a label is gripped between retainer panel 36 and inner wall 26 of the lower element. As best shown in FIG. 10, the end portion of label 11*a* is within groove 38 so as not to be clamped between panel 36 and wall 26. It has been found that restricting the extent to which an end portion of a label is clamped between these two components assists in the application of a label as described in the next paragraph. The side view of FIG. 10 illustrates the relative positioning of tool 20 and label 11*a* upon completion of this step. After this condition has been reached, the tool 20 is lifted away from the liner 12, preferably at an angle to the liner, and label retainer-wiper plate 35 moves downwardly after being out of contact with the liner such that its retainer panel 36 moves towards inner wall 26 of the lower element 23 so as to clamp or grip part of label 11*a* therebetween.

Figure 11:
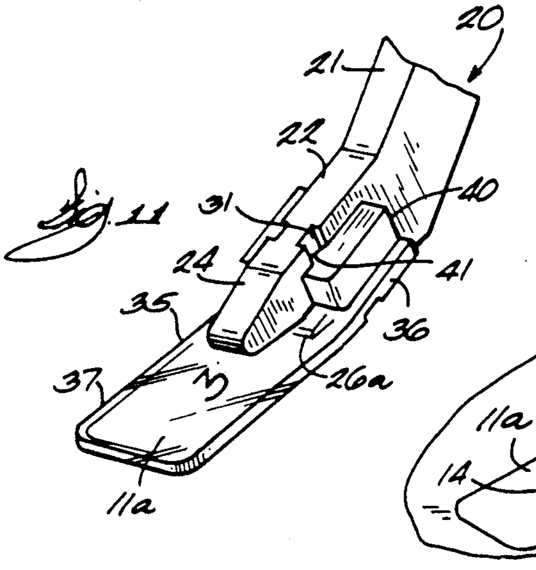
FIG. 11 is a perspective view, with a portion cut away, illustrating the tool being used to transport a label removed from an assembly.

FIG. 11 illustrates tool 20 after it has been lifted away from the liner of the assembly 10 and label 11*a* is gripped between retainer panel 36 of plate 35 and inner wall 26 of the lower element 23. The label is thereby firmly held in place between these two components so that the person using the tool can readily transport the label to the object to which the label is to be applied without fear of the label falling from or being released from the tool. It may be noted that a person's fingers do not touch the label as it is being removed from the liner or being transported. Also, depending on the size of the label, all or part of the label will be underneath plate 35 of the tool during transport.

Figure 12:
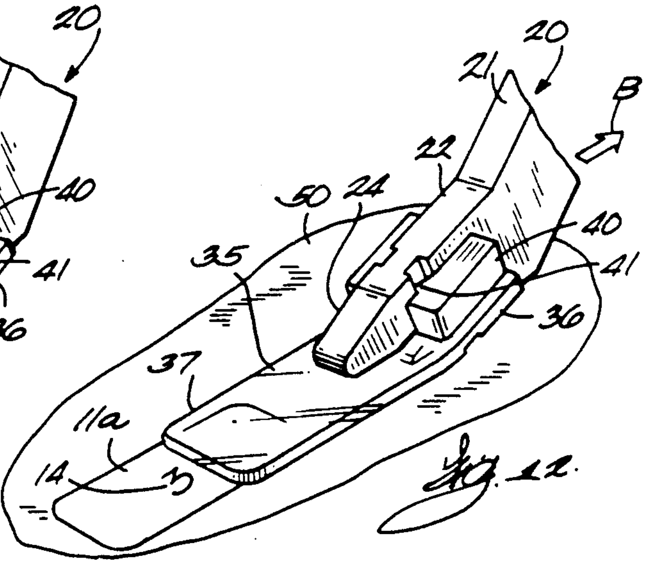
FIG. 12 is a perspective view illustrating the tool being used to apply the label removed from the assembly in FIGS. 7-11.
Figure 8:
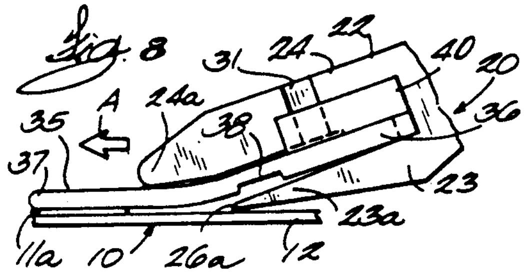
FIG. 8 is an enlarged side view further illustrating the step of FIG. 7.

FIG. 12 illustrates the final step in the label removal and application process. Tool 20 carrying label 11*a* is brought along surface 50 of an object to which the label is to be applied and brought downwardly onto the surface 50 so that adhesive layer 13 on the bottom of the label is brought into contact with the surface and wiper panel 37 of plate 35 of the tool is pressed downwardly and handle 21 is rocked forward so that plate 35 is moved to its second position toward inner wall 27 of upper element 24 of the foot member of the tool. This upward movement of plate 35 to its second position results in the forward portion of retainer panel 36 of the plate again moving away from inner wall 26 of lower element 23, in the manner illustrated in FIG. 8 in connection with the initial phase of label removal. Next, tool 20 is moved away from the outer end of label 11*a*, in the direction of arrow B of FIG. 12, and during this rearward movement, wiper panel 37 of plate 35 is wiped across label 11*a* so that the label can be smoothly and firmly adhered to surface 50.

The foregoing description presents numerous advantages of the label removal and applicator tool of the present invention. During removal of a pressure sensitive adhesive label from an assembly, such as illustrated FIGS. 7-10, a person's fingers need not touch the label or its adhesive layer. Also, the sharp leading edge portion of the lower element of the foot member of the tool will cleanly lift an end portion of a label without crushing, folding or creasing the label. The label is thereby removed from an assembly in a flat, clean condition. After the label is removed from assembly and before it is applied to an object, the plate 35 and lower element of the foot member cooperate so as to hold the label in between the two of them and retain the label in place. This provides for safe and secure transport of the label from the assembly from which it has been removed to the site at which it is to be applied to an object. Again, during this transport of the label, a person's fingers need not touch the label or the adhesive layer. During application of a label, such as illustrated in FIG. 12, the forward wiper panel of the label retainer-wiper plate 35 serves to smooth over a label as it is being applied to an object. This action insures that the label will be firmly adhered to the object; just as important, this also assures that the label will be applied in a smooth unwrinkled physical condition, without creases or folds that could impair its adherence to the object. During the application step, it will again be noted that a person's fingers need not touch the label. Lastly, another important advantage of the tool of the invention is illustrated with respect to the application step of FIG. 12. It will be noted that the retainer-wiper plate 35 is shown in the preceding drawings to be of transparent material, molded transparent plastic in the presently preferred form. Transparency of plate 35 enables the person applying the label to see its legend 14 through the plate before and during the act of application. This visual check of the legend on the label permits the person to orient the legend in desired relationship with the object to which the label is applied. This can be important in many uses of labels for industrial identification in which the label must be oriented in a particular manner with respect to an edge or surface of the object. Also, it is further preferable to make the foot member of transparent material to additionally assist in the visibility of the legend on the label.

As described in detail above, we have developed a new label removal and applicator tool that is capable of providing important new advantages in connection with the application of pressure sensitive adhesive labels from an assembly of the labels. Our invention has been set forth in complete detail so as to enable its full understanding and practice by those skilled in the art. The embodiments described herein are intended as exemplary structures incorporating the concepts of our invention, and it should be noted that modifications can be made and other structures can be developed within the scope of the appended claims that are within the subject matter of our present invention.

We claim:

1. A removal and applicator tool for removing adhesive labels carried on a liner and applying the labels to an object comprising, in combination:

a handle, a foot member extending from the handle and including a lower element spaced from an upper element, the lower element having a leading edge portion, and a label retainer-wiper plate secured between the upper element and lower element of the foot member, the label retainer-wiper plate including a retainer panel between the upper and lower elements of the foot member and a wiper panel extending beyond the leading edge portion of the foot member, the plate being movable between a first position in which the retainer panel is in contact with the lower element to retain a label therebetween and a second position in which at least a portion of the retainer panel is out of contact with the lower element for removing a label from a liner and for application of a label to an object with the tool.

2. A removal and applicator tool for removing pressure sensitive adhesive labels carried on a liner and applying the labels to an object comprising, in combination:

(1) a handle and a foot member extending from the handle;

(2) the foot member including (a) a lower element that has an exterior bottom wall and an inner wall inclined at an angle to the bottom wall, and the bottom wall and inner wall intersect to define a leading edge portion of the lower element, and (b) an upper element spaced from the lower element and that has an inner wall spaced from the inner wall of the lower element;

(3) a label retainer-wiper plate secured to the foot member between the lower element and upper element and including a retainer panel extending along the inner wall of the lower element and a wiper panel extending beyond the leading edge portion of the lower element, said plate being flexible between a first position in which the retainer panel contacts the inner wall of the lower element of the foot member to retain a label therebetween and a second position in which the retainer panel is separated from said inner wall to receive and retain a label therebetween upon removal of the label from the liner and to release a label retained therebetween upon application of the label to an object, and the wiper panel of said plate wipes across at least a portion of a label upon movement of the tool with said plate in its second position.

3. A tool according to claim 2 wherein said plate is transparent.

4. A tool according to claim 2 wherein the retainer panel of the label retainer-wiper plate includes a transverse groove facing the inner wall of the lower element to limit the portion of a label retained between the retainer panel and said inner wall.

* * * * *